(12) United States Patent
Chivel (10) Patent No.: US 11,235,423 B2
(45) Date of Patent: Feb. 1, 2022

(54) LASER CLADDING METHOD AND DEVICE FOR IMPLEMENTING SAME

(71) Applicant: Yury Alexandrovich Chivel, Minsk (BY)

(72) Inventor: Yury Alexandrovich Chivel, Minsk (BY)

(*) Notice: Subject to any disclaimer, the term of this patent is extended or adjusted under 35 U.S.C. 154(b) by 0 days.

(21) Appl. No.: 15/123,752

(22) PCT Filed: Feb. 6, 2015

(86) PCT No.: PCT/IB2015/000125
§ 371 (c)(1),
(2) Date: Jun. 7, 2017

(87) PCT Pub. No.: WO2015/132640
PCT Pub. Date: Sep. 11, 2015

(65) Prior Publication Data
US 2017/0312856 A1    Nov. 2, 2017

(30) Foreign Application Priority Data

Mar. 6, 2014   (RU) ................................ 2014108832

(51) Int. Cl.
*B23K 26/342*    (2014.01)
*B23K 26/064*    (2014.01)
(Continued)

(52) U.S. Cl.
CPC ............ *B23K 26/342* (2015.10); *B22F 3/115* (2013.01); *B23K 26/064* (2015.10);
(Continued)

(58) Field of Classification Search
CPC ................ B29C 64/153; B29C 64/268; B22F 2003/1056; C04B 41/0036; B23K 26/06;
(Continued)

(56) References Cited

U.S. PATENT DOCUMENTS 3,865,564 A * 2/1975 Jaeger ................ B23K 26/0734
219/121.62
4,135,902 A * 1/1979 Oehrle .................. C03B 37/029
65/392

(Continued)

FOREIGN PATENT DOCUMENTS

BY    6931 C1    3/2005
EA    7043 B1    3/2004
(Continued)

*Primary Examiner* — Karl Kurple (57) ABSTRACT

A method and device for laser cladding by independently heating the cladding material and the surface of the workpiece consist in formation of the series of parallel annular laser beams, possibly different wavelengths, with an adjustable distribution of laser radiation power across the annular beams. The annular beams are transformed into a series of conical beams which are separately focused along a single optical axis, along which the cladding material is fed. The device can be supplemented with a cylindrical mirror for the multipass laser radiation through the stream of cladding material with the possibility of the laser radiation return to the laser resonator.

7 Claims, 6 Drawing Sheets

(51) Int. Cl.
    *B23K 26/06*     (2014.01)
    *B23K 26/14*     (2014.01)
    *B23K 26/067*    (2006.01)
    *C23C 4/00*      (2016.01)
    *C23C 26/02*     (2006.01)
    *B23K 26/073*    (2006.01)
    *B23K 26/34*     (2014.01)
    *G02B 5/00*      (2006.01)
    *B22F 3/115*     (2006.01)
    *H01S 3/00*      (2006.01)
    *B23K 26/144*    (2014.01)
    *B23K 26/146*    (2014.01)

(52) U.S. Cl.
    CPC ........ *B23K 26/067* (2013.01); *B23K 26/0617* (2013.01); *B23K 26/0643* (2013.01); *B23K 26/0648* (2013.01); *B23K 26/0665* (2013.01); *B23K 26/0676* (2013.01); *B23K 26/0734* (2013.01); *B23K 26/0736* (2013.01); *B23K 26/14* (2013.01); *B23K 26/144* (2015.10); *B23K 26/146* (2015.10); *B23K 26/1476* (2013.01); *B23K 26/34* (2013.01); *C23C 4/00* (2013.01); *C23C 26/02* (2013.01); *G02B 5/001* (2013.01); *H01S 3/0071* (2013.01)

(58) Field of Classification Search
    CPC ............ B23K 26/062; B23K 26/064; B23K 26/0643; B23K 26/073; B23K 26/0732; B23K 26/0734; B23K 26/0736; B23K 26/0738; B23K 26/067; B23K 26/0673; B23K 26/0676; B23K 26/0648; B23K 26/0652
    USPC .......... 219/121.62, 121.76, 121.77
    See application file for complete search history.

(56) References Cited

U.S. PATENT DOCUMENTS

| | | | | | |
|---|---|---|---|---|---|
| 4,456,811 | A * | 6/1984 | Hella | ................ | B23K 26/0734 148/565 |
| 4,689,467 | A * | 8/1987 | Inoue | ................ | B23K 10/00 219/121.6 |
| 4,724,299 | A * | 2/1988 | Hammeke | ............ | B05B 7/1486 219/121.6 |
| 5,187,761 | A * | 2/1993 | Mehadji | ............... | G02B 6/3833 385/76 |
| 5,208,434 | A * | 5/1993 | Minamida | ............ | B23K 26/06 219/121.6 |
| 5,449,879 | A * | 9/1995 | Lawson | ............ | B23K 26/0734 148/565 |
| 5,557,628 | A * | 9/1996 | Kuba | .................... | B23K 26/06 372/35 |
| 5,690,845 | A * | 11/1997 | Fuse | .................. | B23K 26/0608 219/121.74 |
| 5,848,091 | A * | 12/1998 | Mombo Caristan | ... | B23K 26/06 372/103 |
| 6,016,227 | A * | 1/2000 | Hopkins | ................ | B23K 26/06 359/668 |
| 6,717,106 | B2 * | 4/2004 | Nagano | .............. | B23K 26/0604 219/121.65 |
| 6,756,561 | B2 * | 6/2004 | McGregor | ......... | B23K 26/0604 219/121.63 |
| 6,860,960 | B1 * | 3/2005 | Flanagan | .......... | A61M 25/1025 156/272.8 |
| 7,102,118 | B2 * | 9/2006 | Acker | ................ | B23K 26/0604 250/216 |
| 7,820,936 | B2 * | 10/2010 | Weber | .................. | B23K 26/073 219/121.64 |
| 2002/0021723 | A1* | 2/2002 | Amako | .............. | B23K 26/0604 372/23 |
| 2002/0162973 | A1* | 11/2002 | Cordingley | .......... | B23K 26/032 250/492.2 |
| 2003/0052105 | A1* | 3/2003 | Nagano | .............. | B23K 26/0604 219/121.83 |
| 2003/0075529 | A1* | 4/2003 | Mazumder | ......... | B23K 26/0643 219/121.6 |
| 2003/0102291 | A1* | 6/2003 | Liu | ....................... | B23K 26/04 219/121.73 |
| 2004/0188396 | A1* | 9/2004 | Talwar | ................. | B23K 26/032 219/121.65 |
| 2006/0091283 | A1* | 5/2006 | Acker | ................... | B23K 26/53 250/201.3 |
| 2006/0119012 | A1* | 6/2006 | Ruatta | .................... | C23C 24/10 264/497 |
| 2006/0213885 | A1 | 9/2006 | Gross et al. | | |
| 2006/0289410 | A1* | 12/2006 | Morita | ................... | B23K 26/03 219/121.67 |
| 2010/0008205 | A1* | 1/2010 | Ohyama | ................ | G11B 7/131 369/103 |
| 2010/0025387 | A1* | 2/2010 | Arai | ........................ | B28D 5/00 219/121.69 |
| 2012/0195334 | A1* | 8/2012 | Wilkiel | .............. | B23K 26/0643 372/26 |
| 2014/0065320 | A1* | 3/2014 | Lin | ........................ | B23K 9/042 427/554 |
| 2016/0074900 | A1* | 3/2016 | Okamoto | ................. | B05C 9/14 118/621 |
| 2019/0047894 | A1* | 2/2019 | Heiss | .................... | C03B 33/091 |
| 2019/0329357 | A1* | 10/2019 | Avdokhin | ............ | B23K 26/064 |

FOREIGN PATENT DOCUMENTS

| | | |
|---|---|---|
| RU | 2467851 C2 | 2/2007 |
| RU | 2447979 C2 | 10/2021 |

* cited by examiner

LASER CLADDING METHOD AND DEVICE FOR IMPLEMENTING SAME

CROSS REFERENCE TO RELATED APPLICATIONS

This application is a national stage application of the PCT application PCT/IB2015/000125 filed Feb. 6, 2015, which claims priority to Russian patent application RU 2014108831 filed Mar. 6, 2014, currently issued as a patent RU 2580180, issue date is Mar. 14, 2016.

FIELD OF THE INVENTION

This invention relates to laser processing of materials and can be used for laser cladding, including selective laser cladding, laser thermal processing.

The objective of the claimed invention to provide a method and apparatus for laser cladding that ensures empowerment of the laser processing method, increased productivity and manufacturing precision parts, lower energy costs and high quality products.

BACKGROUND OF INVENTION

A method is known of laser cladding, consisting in applying weld material in the focal region of the laser beam disposed on the surface of the workpiece. The disadvantage of this method is the inability to separate the deposited material and heating the workpiece in the area of the laser focus spot.

The closest to the proposed method is shown in Patent BY No 6931 by the current inventor disclosing a process consisting in applying consisting weldable material in the focal region of the laser beam is disposed on the surface of the workpiece. The disadvantage of this method is the inability to separate the deposited material and the heating region of the workpiece to focus the laser spot, resulting in a considerable loss of energy to maintain the molten bath deposition and reduces accuracy.

Laser cladding device known in literature comprises a laser optically coupled to a beam forming system of the ring, rotatable mirror lens.

The disadvantage of this device is the complexity, as well as the inability to separate the heating of the deposited material (wire) and the surface of the workpiece in the field of welding.

The closest in technical essence to the claimed device is presented in Patent RU No 2447979 by the current inventor, the device comprising a laser for selective laser melting, optically coupled to the system and the formation of a conical beam a focusing lens for separate heating of the workpiece and the stream of powder, and the powder feed system.

The disadvantage of this device is the inability to control parameters of the radiation acting on the surface of the workpiece and the powder stream.

SUMMARY OF THE INVENTION

The invention relates to a method and device for the laser cladding of materials.

This laser cladding method consists in feeding a cladding material into the focal region of a laser beam, said region being located on the surface of a workpiece.

A series of parallel annular laser beams with an adjustable distribution of laser radiation power across the annular beams is formed from an initial circular laser beam The annular beams are transformed into a series of conical beams and are separately focused along a single optical axis, along which the cladding material is fed.

Wavelengths of the laser radiation may be different for annular beams.

A cladding material may be a solid, liquid, gas, powder, aerosol or heterogeneous plasma.

The present device comprises a laser, which is optically linked to a system for forming a conical beam, a focusing lens and system for feeding cladding material.

The device additionally comprises an optical system for forming a series of annular laser beams with an adjustable distribution of laser radiation power across the annular beams.

The device additionally comprises a rotating mirror with an opening through which tubes for feeding gas, cooling liquid and cladding material are passed.

The device additionally comprises a system of conical focusing mirrors.

Lens focus and conical mirrors focuses are located along a single optical axis along which the cladding material is fed.

For more efficient use of the laser radiation the device is supplemented with an cylindrical mirror for the mulipass laser radiation through the stream of cladding material with the possibility of the laser radiation return to the laser resonator.

For more efficient heating a workpiece and a cladding material device is supplemented with an optical system for converting the laser wavelength, an optical system for forming a series of annular laser beams of different wavelengths with an adjustable distribution of laser radiation power across the annular beams, a rotating mirror with the dichroic areas and with an opening through which tubes for feeding gas, cooling liquid and cladding material are passed, and a system of conical focusing mirrors. Lens focus and conical mirrors focuses are located along a single optical axis along which the cladding material is fed.

DETAILED DESCRIPTION OF THE INVENTION

The objective of the claimed invention is to elaborate a method and apparatus for laser cladding that ensures improvement of the laser processing method, increase of productivity, reduce of energy consumption while ensuring high precision in the manufacture of parts.

The claimed method of laser cladding consists in applying the deposited material in the focal region of the laser beam which is placed on the surface of the workpiece. Unlike other methods from the initial circular laser beam a series of annular laser beams are formed with an adjustable power distribution across the annular beams. The annular beams are transformed into a series of conical laser beams using conical lens and conical mirrors.

Conical beams are separately focused as to the surface of the workpiece to heat it, and to various areas of the optical axis along which the cladding material is fed. A stream of gas, liquid, powder, heterogeneous plasma jet or wire can be used as cladding material.

Focused conical beams heat various regions of the stream of cladding material. Space-independent and separated heating of workpiece and stream of cladding material provides optimum thermal process conditions, can significantly reduce energy costs and increase cladding accuracy.

For more efficient heating a workpiece and a cladding material with different spectral absorptivity a wavelengths of the laser radiation may be different for annular beams.

With the aim of realization of the claimed method, new device for laser cladding is elaborated, comprising a laser optically coupled with the system of forming a series of conical beams for separate heating of the workpiece and the stream of cladding material.

New is that the device is further provided with a system of forming a series of parallel annular laser beams with adjustable laser power distribution across the annular beams, deflecting mirror with an opening for wiring the gas supply tubes, coolant and the cladding material, focusing lens and conical mirrors. The focus of the lens and the foci of conical mirrors lie on the same optical axis along which the cladding material is fed to the surface.

The device (FIG. 1) comprises a laser 1 with a resonator, optically coupled with an optical system forming a series of annular laser beams with an adjustable power distribution across annular laser beams which comprises adjustable beam expander 2, multifacet conical mirror 47 and multifacet reflective waxicon 3. Series of parallel annular beams 21, 22, 45 are deflected by mirror 4 with an opening for wiring tubes with the coolant 6, the feed gas and the cladding material 5.

Figure 1:
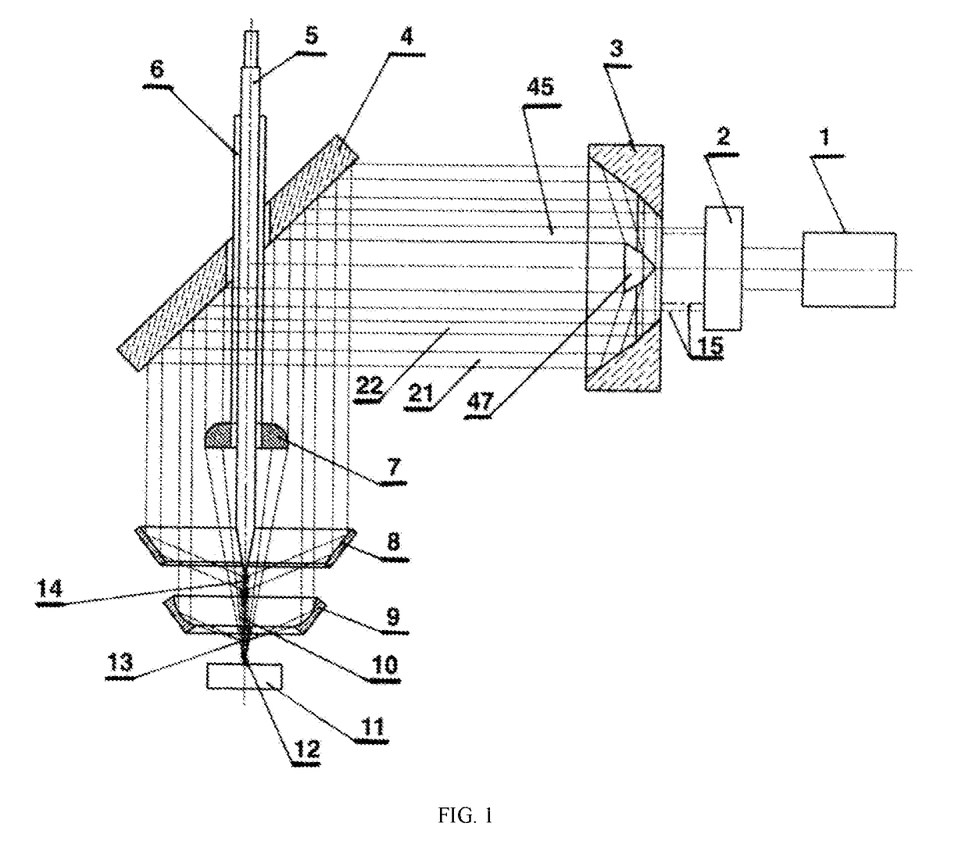
FIG. 1 is the variant of an optical scheme of the inventive device.

Additionally the device includes a focusing lens 7, the focusing conical mirrors 8, 9. One annular beam is focused by lens 7 into the surface of the workpiece 11 and others annular beams are focused by conical mirrors 8,9 into various regions 13, 14 of the cladding material stream 10.

The device operates as follows. The circular laser beam 1 after passing through the beam expander 2 and multifacet waxicon 3 is transformed into a series of annular beams. One of the beams is focused by lens 7 on the product surface 11 to an irradiation spot 12 and melt the product surface 11 in the irradiation spot 12. Cladding material is fed through the tube 5 in the form of a powder stream 10, liquid, plasma or heterogeneous gas stream or wire. Other beams are focused by means of conical mirrors 8, 9 in the predetermined region 13, 14 of the stream 10 to heat these regions 13, 14.

By changing the dimensions of the beam 15 after the beam expander 2 can redistribute the power of the laser on areas 12, 13 and 14 and thereby regulate the process of cladding and efficiency of the heating the surface and a stream of material. This reduces the size of the molten bath, increases the energy input into the solid wire or stream of cladding material because of their small heat sink and, if stream, because of the large absorption of the laser radiation in dense stream.

Figure 2:
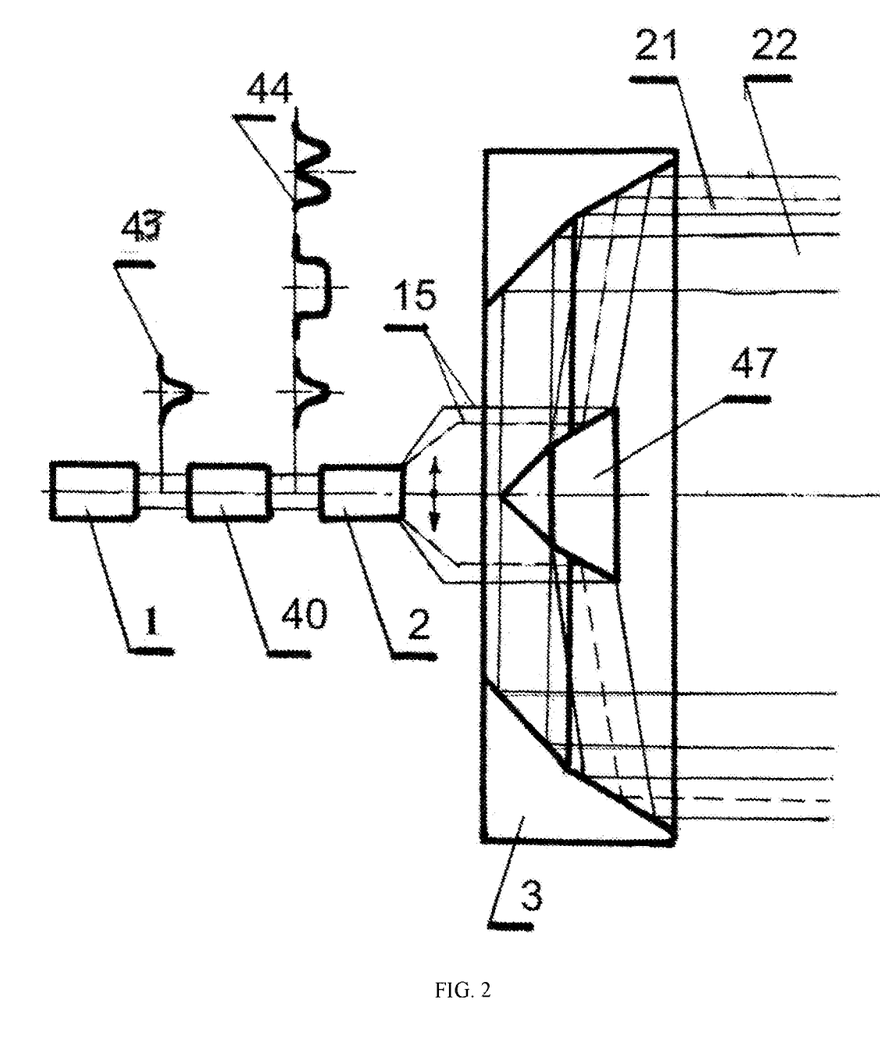
FIG. 2 is the variant of an optical scheme of the production a series of parallel annular laser beams with an adjustable distribution of laser radiation power across the annular beams.
Figure 3:
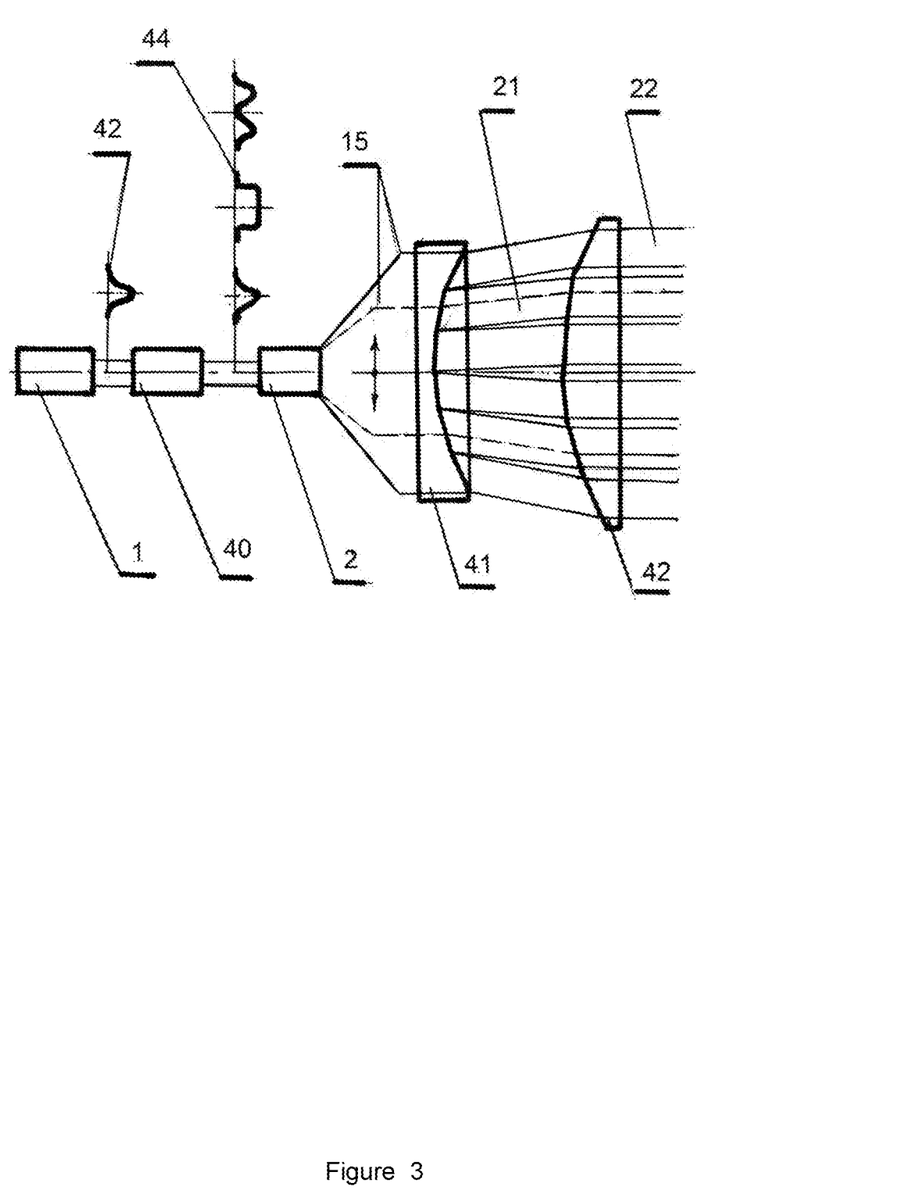
FIG. 3 is another variant of an optical scheme of the production a series of parallel annular laser beams with an adjustable distribution of laser radiation power across the annular beams.

New systems for forming a series of annular beams with an adjustable power distribution across annular laser beams were elaborated (FIG. 2, 3).

The systems further comprises a multiaxicon 41, multifacet conical mirror 47, multifacet waxicon 3 or multifacet lens 42, adjustable beam expander 2 and beam shaper 40.

The devices operate as follows. Radiation of laser 1 with a Gaussian intensity distribution over the cross section of the circular beam 43 is translated using beam shaper 40 into the beam 44 with predetermined intensity distribution—rectangular or any other (super-Gaussian, Lager-Gaussa etc.). An adjustable beam expander 2 transforms the beam 44 into a beam 15 of a given size and with a certain intensity distribution over the beam cross section. The beam 15 is converted by negative 41 multiaxicon or multifacet conical mirror 47 in a series of divergent beams, which are converted into a series of parallel annular beams 21, 22 using multifacet lens 42 or multifacet waxicon 3. Changing the size of the circular beam 15 and the intensity distribution over the cross section of the laser beam 44 the distribution of laser power between annular beams 21 and 22 is changed.

Figure 4:
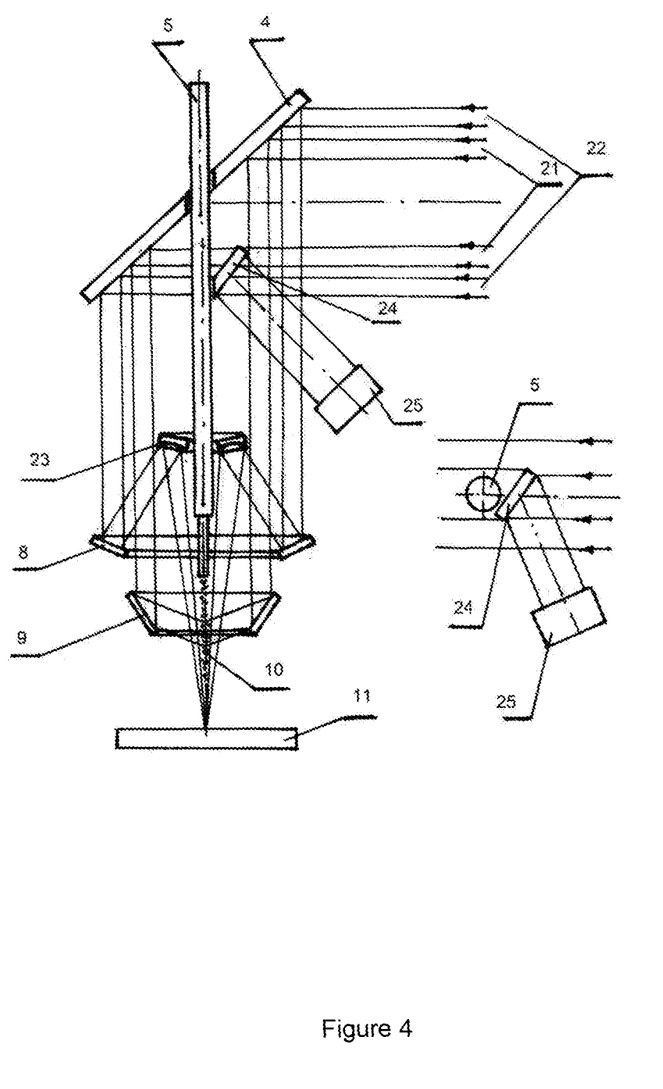
FIG. 4 is the variant of an optical scheme of the inventive device with reflective optics and system of laser beams control.

Variant of the claimed device with conical reflective optics, which is important when using high-power lasers, is shown in FIG. 4. Instead of the lens 7 (FIG. 1) the conical focusing mirror 23 is set. This scheme also introduces the option of using part of the laser radiation, shaded by tube 5. This part of radiation can be used for heating tube 5 and cladding material passing through it. In other embodiment of the device (FIG. 4), this part of the radiation is deflected by mirror 24 to the unit of the laser parameters control 25.

Figure 5:
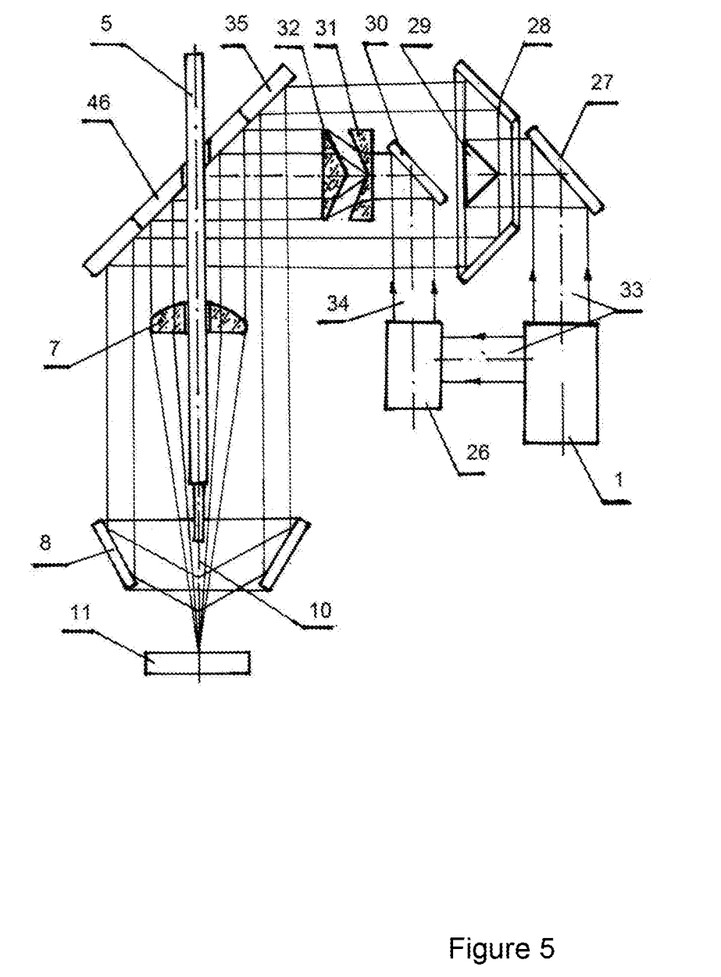
FIG. 5 is the variant of an optical scheme of the inventive device with annular beams having different wavelengths.

For more efficient heating of a workpiece and a cladding material with different spectral absorptivity, the claimed device is supplemented with an optical system for forming a series of annular laser beams of different wavelengths with an adjustable distribution of laser radiation power across the annular beams, the optical system comprises wavelength converter 26, rotary mirrors 27, 30; refractive axicon 32 and refractive waxicon 31, conical mirror 29, waxicon 28 and a rotating dichroic mirrors 46, 35 (FIG. 5).

The device operates as follows. The circular beam 33 with λ1 wavelength (FIG. 5) of radiation is converted using converter 26 to circular beam 34 with wavelength λ2. With the use of rotary mirrors 27, 30 refractive axicon 32 and refractive waxicon 31 conical mirror 29 and waxicon 28 annular laser beams with different wavelengths are formed. These beams are deflected by dichroic mirrors 46 and 35 to the lens 7 and the conical mirror 8. As a result, the heating of the workpiece 11 in the focus of the lens 7 and the stream 10 of the cladding material is carried out by laser radiation with different wavelengths.

Figure 6:
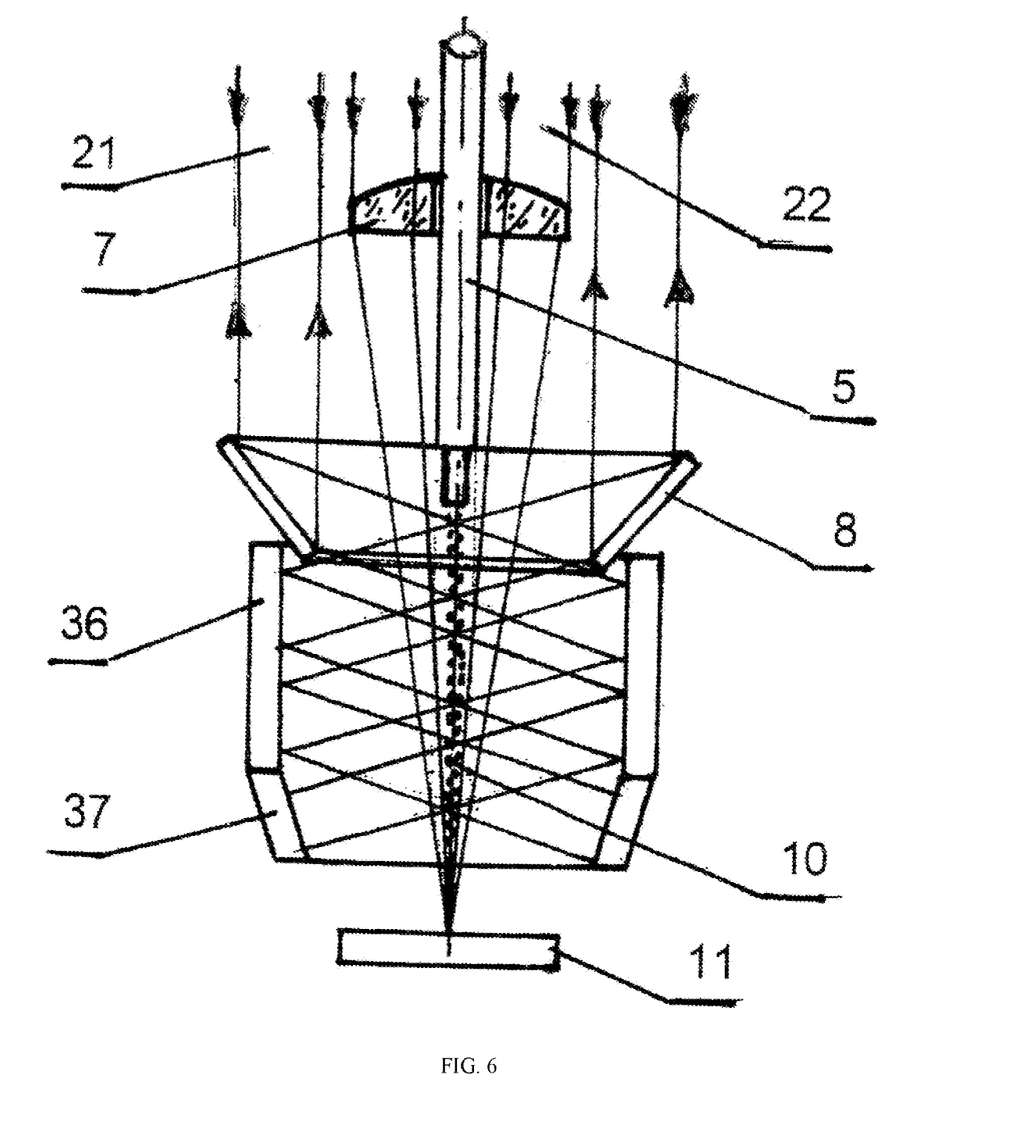
FIG. 6 is the variant of a multipass optical scheme.

With low absorption of the laser radiation in the stream of the cladding material, when using a single pass through stream efficiency of laser radiation drops sharply. For maximum use of laser radiation, a multipass scheme using a cylindrical mirror 36 and a conical mirror 37 (FIG. 6) is provided. This increases the number of passes of laser radiation through the stream: the return backwards radiation by conical mirror 37 the laser radiation returns to the laser resonator of the laser 1 by conical mirror 37. It first increases the stream heating and secondly allows efficient use of the laser radiation when returning the coherent (not scattered) part of the laser radiation to resonator of laser 1.

Thus, the claimed method and apparatus of laser cladding, reduces energy consumption, improve the accuracy and quality of cladding.

The invention claimed is:

1. A laser cladding device, comprising: a laser, which is optically linked to a system for forming conical beams, a focusing lens, a rotating mirror with an opening through which a tube is passed for feeding a cladding material, wherein the laser cladding device further includes an optical system for forming a series of annular laser beams from a circular laser beam with an adjustable distribution of a laser radiation power across the annular laser beams and a system of conical focusing mirrors of the system for forming conical beams, a focus of the focusing lens and foci of the conical focusing mirrors of the system for forming conical beams are located along a single optical axis along which the cladding material is fed; wherein the optical system for forming a series of annular beams further comprises a multifacet reflective waxicon and an adjustable beam expander; the conical beams are focused along the single optical axis to provide independent heating of sections of the cladding material and a surface of a workpiece.

2. The laser cladding device of claim 1, wherein the system for forming conical beams includes a cylindrical mirror and a conical mirror for a laser radiation multi-passage through a stream of the cladding material and a return of the laser radiation to a laser resonator.

3. The laser cladding device of claim 1, wherein the cladding material is a solid, a liquid, a gas, a powder, an aerosol, or a heterogeneous plasma.

4. The laser cladding device of claim 1, wherein the device includes an optical system for forming a series of annular beams of different wavelengths, which are transformed into the series of conical beams of different wavelengths.

5. A laser cladding method using the laser cladding device of claim 1, comprising the step of: feeding the cladding material into a focal region of the circular laser beam located on a surface of the workpiece, wherein:

initially, the circular laser beam after passing through the multifacet reflective waxicon and the adjustable beam expander comprised in the optical system for forming the series of annular beams is transformed into a series of parallel annular laser beams with the adjustable distribution of laser radiation power across the series of parallel annular beams;

the series of parallel annular beams are transformed into the series of conical beams and are separately focused along the single optical axis, along which the cladding material is fed; the series of conical beams are focused along the single optical axis to provide independent heating of sections of the cladding material and the surface of the workpiece.

6. The laser cladding method of claim 5, wherein the cladding material is a solid, a liquid, a gas, a powder, an aerosol or a heterogeneous plasma.

7. The laser cladding method of claim 5, wherein laser radiation wavelengths are different for different annular beams.

* * * * *